United States Patent [19]

Hullah

[11] Patent Number: 4,579,743
[45] Date of Patent: Apr. 1, 1986

[54] METHOD FOR PREPARING PAR-FRIED SLICED POTATO PRODUCTS AND PRODUCT THEREOF

[75] Inventor: William Hullah, Don Mills, Canada

[73] Assignee: Cardinal Biologicals, Ltd., Don Mills, Canada

[21] Appl. No.: 728,508

[22] Filed: Apr. 29, 1985

[51] Int. Cl.[4] ............................................. A23L 1/217
[52] U.S. Cl. ................................... 426/262; 426/393; 426/441; 426/524; 426/637
[58] Field of Search ............... 426/262, 637, 438, 441, 426/393, 524, 808

[56] References Cited

U.S. PATENT DOCUMENTS

| | | |
|---|---|---|
| 3,050,404 | 8/1962 | Traisman . |
| 3,175,914 | 3/1965 | Vahlsing, Jr. . |
| 3,394,010 | 7/1968 | Miller .................................. 426/262 |
| 3,397,993 | 8/1968 | Strong . |
| 3,424,591 | 1/1969 | Gold . |
| 3,634,105 | 1/1972 | Beck et al. ....................... 426/637 X |
| 3,773,527 | 11/1973 | Ruggerone .......................... 426/637 |
| 3,881,028 | 4/1975 | Capossela et al. ............... 426/637 X |
| 3,959,501 | 5/1976 | Shatila ............................ 426/637 X |
| 3,975,551 | 8/1976 | Shatila ............................. 426/637 |
| 4,097,612 | 6/1978 | Powrie et al. ................... 426/262 X |
| 4,109,020 | 8/1978 | Gorfien et al. ................. 426/637 X |
| 4,389,424 | 6/1983 | Hasegawa ....................... 426/637 X |

FOREIGN PATENT DOCUMENTS 750479 10/1970 Belgium ............................... 426/441

OTHER PUBLICATIONS

Potato Processing by Ara Smith and W. F. Talburt-AVI Publishing Co. 1967, pp. 415–431, "Frozen French Fries and Other Frozen Potato Products".
Potatoes: Production, Storing, Processing by Ara Smith, AVI Publishing Co. 1977, pp. 340–373, "Frozen French Fries and Other Frozen Potato Products".
Potatoes: Production, Storing, Processing by Ara Smith, AVI Publishing Co. 1977, pp. 491–511, "Pre--Peeled Potatoes".

Primary Examiner—Arthur L. Corbin
Attorney, Agent, or Firm—Browdy and Neimark

[57] ABSTRACT

Par-fried sliced potato products storable under refrigeration are prepared. Initially, surface sugar molecules and starch molecules on the sliced potato are cross-linked. The cross-linked potato is then water blanched and soaked in a solution containing an oxidizing agent, a non-reducing sugar, and an antioxidant preservative. The potatoes are then par-fried. The potatoes are then cryogenically cooled and packaged under a blanketing atmosphere containing an $N_2$ (or other inert gas)- $CO_2$ mixture. The inert gas/$CO_2$ mixture inhibits microbiological growth without causing the formation of carboxylic acids. The product is then stored under refrigeration until ready for use. The products have a shelf life of 8–10 weeks when refrigerated.

21 Claims, No Drawings

METHOD FOR PREPARING PAR-FRIED SLICED POTATO PRODUCTS AND PRODUCT THEREOF

BACKGROUND OF THE INVENTION

This invention relates generally to potato products and more particularly to par-fried potato products prepared for finish-frying at a later time.

Fried potato products, and french fries in particular, have been extremely popular over the last few decades. While it is generally agreed that fried potato products are best when freshly prepared from whole potatoes, the preparation of these products from whole potatoes is too time-consuming and costly for most restaurants and home consumers to undertake often. Therefore, most restaurants buy frozen french fries, which have been previously par-fried, and finish-fry them immediately prior to serving. Home consumers often buy frozen french fries and then oven bake or pan fry them prior to serving. Nevertheless, deep-fry or pan-fry finishing almost always results in a more flavorful, better-textured product than oven-bake finishing.

While most frozen french fries presently on the market result in reasonably satisfactory products when finish-fried, even the best presently available frozen french fries have flavor and texture defects. One defect results from the necessary dehydration of the par-fried potato product to between 23 and 26% moisture prior to freezing. This dehydration results in an increased uptake of oil during finish frying in comparison to freshly fried potatoes.

Furthermore, this moisture reduction often results in a final product that is leathery and tough. Texture is extremely critical to consumer acceptance of a food product, and especially consumer acceptance of french fries. Ideally, french fries should have a thin, golden, crispy skin and a meaty, but delicate, interior similar to that of a baked potato. Even if a previously frozen french fry appears and tastes similar to the fresh product, a tough or otherwise improper texture significantly decreases consumer acceptance.

Also, many persons are attempting to cutdown on their intake of dietary fats, especially saturated and polyunsaturated fats. Excessive intake of saturated fats can result in high cholesterol levels and an increased risk of heart attack. Excessive intake of polyunsaturated fats are suspected to increase the risk of cancer. French fries are typically fried in either saturated (from animal fat, peanut oil, hydrogenated vegetable oils, etc.) or polyunsaturated (corn oil, sunflower oil, etc.) fats. Thus, the increased fat absorption during finish frying exhibited by frozen french fries increases the health risks associated with these products, as well as increasing the caloric content of the final product.

Additionally, freezing, even quick freezing, results in structural damage due to ice crystal formation. This structural damage can decrease shelf-life, harm texture, and adversely affect taste.

Frozen french fries must be either thawed prior to finish frying or finish fried from the frozen state. Obviously, the threat of increased bacterial growth and time considerations make thawing prior to finish frying impractical. Also, frozen fries thawed prior to frying have an increased oil uptake. The use of frozen french fries in the finish frying step, however, obviously increases the time required for finishing and requires greater energy consumption to compensate for the temperature drop in the bath resulting from the introduction of the frozen fries. Further, ice crystals clinging to the outside of the french fries result in splattering, foaming, oxidation and bubbling of the frying oil.

To overcome these difficulties encountered with frozen fried potato products, attempts have been made to prepare par-fried potato products suitable for refrigeration. Nevertheless, for several reasons, these attempts have not achieved complete success and an acceptable, refrigerated par-fried potato product had not, to date, been produced.

A major problem with refrigerated products has been spoilage. The fat in french fries is highly susceptible to both reactions with oxygen and hydrolysis by moisture present within the fry. While hydrolysis from moisture within the french fry may be overcome to some extent by the incorporation of antioxidants such as ascorbic acid or erythorbic acid, oxidation by reaction with oxygen is more problematic.

One approach to preventing oxidation of food by reaction with oxygen has been vacuum packing. A major difficulty with this approach has been "weeping", i.e., the seepage of moisture from the inside of the product to its outer surface, which reduces the shelf-life of the product.

Another approach has been packing under carbon dioxide. However, when refrigerated fries are packed under carbon dioxide, carboxylic acid is formed, giving the product a tinny taste.

Par-fried french fries packaged under pure nitrogen do not develop carboxylic acids, but nitrogen exhibits no antimicrobial effects. Thus, par-fried products packed under nitrogen (or other inert gases) develop a stale taste rather quickly. This stale taste is believed to be a result of bacterial or mold growth.

The difficulty of storing par-fried potatoes at refrigeration temperatures has been noted in several studies. In one study, a taste panel scored french fries that had been finish-fried in deep fat after 3 days storage at 55° F. significantly lower than french fries that had been held at 0° F. Microbiological counts were also found to increase rapidly under such conditions (see O. Smith, Potatoes: Production, Storage, Processing, AVI Publishing Co. (1977), incorporated herein by reference, at pp. 340–373).

Also, the cost of maintaining products in the frozen state as opposed to refrigeration is high. Moreover, most industrial users of par-fried potatoes have more space available for refrigeration than freezing.

SUMMARY OF THE INVENTION

It is an object of the present invention to provide a sliced, par-fried potato product, which, when finish-fried, has the taste, texture, and color of a freshly fried sliced potato.

It is another object of the present invention to provide a par-fried sliced potato product which requires minimum storage expenses.

It is a further object of the present invention to provide a par-fried sliced potato product which may be refrigerated for long periods of time without any noticeable deterioration in quality.

These and other objects are achieved by the present invention. Initially, surface sugar molecules and starch molecules on the sliced potato are cross-linked. The cross-linked potato is then water blanched and soaked in a solution containing an oxidizer, a non-reducing sugar, and an antioxidant preservative. The potatoes are then par-fried. The potatoes are then cryogenically cooled and packaged under a blanketing atmosphere containing an $N_2$ (or other inert gas)- $CO_2$ mixture. The inert gas/$CO_2$ mixture inhibits microbiological growth without causing the formation of carboxylic acids. The product is then stored under refrigeration until ready for use.

DETAILED DESCRIPTION OF THE PREFERRED EMBODIMENT

Initially, peeled, trimmed and cut potatoes are treated by forming cross-linkages between labile hydrogen atoms on the primary alcohols of the starch and sugar molecules on the surface of the raw potatoes. Potatoes having a high solid content (78–88% depending on the species) are preferentially used as the starting material. Of course, peeling may not be necessary if a product having fried potato skin is desired.

The method used to carry out the cross-linking is not important, so long as an edible, pharmaceutically acceptable, modified product containing ether and/or ester cross-linkages is produced. The processed potatoes have a reduced surface sugar and starch content which results in improved crispness, color and flavor without excessively long frying periods.

A typical method for carrying out the above cross-linking step is described in U.S. Pat. No. 3,394,010 to Miller, incorporated herein by reference. In that process, typical cross-linking agents include aliphatic dihalides such as propylene dichloride, dichloropentanes (generally available as mixtures), ethylene dibromide (not recommended for health reasons), glycol dichlorohydrin, and dichlorobutane; ether-forming epoxy halogen compounds such as epichlorohydrin and epibromohydrin; phosphorus-containing compounds such as phosphorus oxychloride, metaphosphates, and polymetaphosphates, e.g. the sodium potassium, or other alkali salts of the latter two; and aliphatic acid anhydrides. The preferred cross-linking agents include phosphorus oxychloride, polymetaphosphates, epichlorohydrin, succinic anhydride and adipic anhydride. More preferred are alkali, and especially sodium or potassium, hexametaphosphates, and succinic anhydride. Most preferred is sodium hexametaphosphate.

The pH of the aqueous medium employed will vary depending upon the nature of the particular cross-linking agent utilized, the pH corresponding to that conventionally known to promote the reaction of the given cross-linking agent with starch molecules. Usually, the pH of the aqueous media will be adjusted to be within the range of from about 5 to 12, by the appropriate addition of an alkali or an acid such as hydrochloric or acetic acid. More generally, the aqueous media is alkaline, e.g., an about 0.25 to 1.0% aqueous solution of an alkali such as sodium hydroxide, sodium carbonate, potassium hydroxide or potassium carbonate.

The cross-linking agent is employed in amounts effective to provide a resultant modified product which is less susceptible to hydration and caramelization and develops increased crispness when it subsequently is cooked, e.g., fried. The particular amount of cross-linking agent employed varies depending upon the specific agent employed and the degree of modification desired. Typically, the amount of cross-linking agent consumed in the reaction is less than about 0.1%, and more generally less than about 0.05%, of the potato total weight.

The concentration of cross-linking agent in the reaction medium suitably may vary over a relatively wide range but preferably the reaction medium is dilute with respect to the cross-linking agent, e.g., contains less than about 0.5% cross-linking agent by weight of the aqueous medium. When phosphorus oxychloride is employed as the cross-linking agent, for example, it usually is used at concentrations of at least about 0.01%, and from about 0.015 to 0.35%, by weight of the treating solution. When epichlorohydrin and succinic acid are utilized as cross-linking agents, they usually are employed at concentrations of at least about 0.01% and from about 0.02 to 0.4%, by weight of the treating solution.

The term "slices" is intended to refer to relatively large discrete pieces of whole potatoes, as opposed to powders, and includes all usual forms of slices, such as those normally employed for producing potato chips, julienne potatoes, shoestring potatoes, french fried potatoes, and the like. Untreated potato slices and those preliminarily given a conventional pretreatment to reduce enzyme activity, reducing sugar content, and the like are contemplated for use. In the preferred embodiments of the process, the starting potato slices, where necessary, are given a preliminary treatment to lower the content of reducing sugars present to suitable levels. The use of such a pretreatment improves the characteristics of the cooked potato products ultimately obtained.

In this process the potato slices employed are brought in contact with the aqueous medium containing the cross-linking agent. The potatoes are maintained in contact with the treating medium for a period sufficient to produce substantially complete cross-linking throughout the surface of the potato slices. Generally it is preferred that the treatment be carried out without gelatinizing the starch present using temperatures within the range of from 40° to 140° F. Actual time periods employed may vary, preferred periods for given systems depending primarily upon the cross-linking agent employed.

In general, the desired surface cross-linking of the potato slices being treated can be achieved using treating time periods of less than two hours, e.g., from 30 seconds to 30 minutes. Phosphorus oxychloride, succinic acid, and sodium polymetaphosphate exemplify cross-linking agents with which such treating time periods generally are employed. Epichlorohydrin, on the other hand, requires longer reaction periods to effect the desired surface cross-linking. Typical reaction periods in embodiments using epichlorohydrin as the cross-linking agent usually fall within the range of two hours to 20 hours. Overtreating is to be avoided since it tends to result in ultimately less crisp and darker cooked products. The optimum treating periods for given systems easily may be determined by the routineer.

After maintaining the raw potato slices in contact with the treating aqueous medium for a period sufficient to effect the desired reaction of the cross-linking agent, the potatoes are removed from the media and suitably washed with water to remove residual aqueous treatment medium. The resultant treated potato slices may be treated to adjust reducing sugar content blanching, prior to cooking.

In the most preferred method of cross-linking, the peeled, trimmed and cut potatoes are dipped in a solution containing about 0.02 to 4% sodium hexametaphosphate and about 0.05 to 1.0% sodium hydroxide for about 15 sec. to 30 min. All percentages in the specification and claims are weight percentages unless specifically stated otherwise.

Water soluble surface sugars are then removed, preferably by water blanching at about 75°–100° C. for about 3–6 minutes. After blanching, the potato slices are dipped in an aqueous solution containing about 0.05–1.0 percent of an alkali (preferably sodium or potassium, and most preferably sodium) acid pyrophosphate or an equivalent oxidizing agent such as an alkali sulfite or bisulfite or alkali salt of ethylenediaminetetraacetic acid which is effective to oxidize all reduced compounds present to an oxidized state, about 0.05–0.3% of a nonreducing sugar (preferentially a dissacharide and most preferentially dextrose), and a preserving amount of an antioxidant such as gamma tocopherol, propyl gallate, nondihydroguairetic acid, gallic acid, ascorbic acid or erythorbic acid for about 30 sec. to 5 mins. Typically, best results are obtained when the antioxidant is erythorbic or ascorbic acid. Most preferably the antioxidant is erythorbic acid. When the antioxidant is erythorbic or ascorbic acid (or a mixture of the two) the appropriate preserving amount is about 0.02–1.0%. The potato slices are generally dipped for about 30 sec. to 5 mins. This solution has been found to provide an excellent medium for preserving the quality of processed potatoes and preventing potato blackening.

Next, the potatoes are par-fried, preferably for about 2–4 mins., typically at about 300°–375° F., more preferably at about 325°–350° F. and most preferably at about 325° F. The potatoes are then defatted to a fat level of about 2–5%. Defatting may be accomplished by any known means such as by a vibrating conveyor (typically one or two passes), microwave, infrared, or blown air. The moisture content of the potatoes should be made to range from about 40–65%, preferably about 41–54% and most preferably about 48%. Typically, moisture is controlled by the time and temperature used during par-frying and/or adjusting the blanching time. Increasing the par-frying temperature or time or blanching time decreases the moisture content of the fry.

At this point, the fries are cryogenically cooled, typically by liquid nitrogen or $CO_2$ refrigeration, to a temperature slightly above their freezing point, i.e., about +3° to −1° C. The cryogenic cooling of the fries quickly stops deleterious enzymation, browning and softening.

After cryogenic cooling, the fries are inert gas-packed in an atmosphere having about 10–35% $CO_2$, the remainder comprising $N_2$ or another inert gas. No more than about 1.0% and preferably less than about 0.9% residual oxygen should be present. The $CO_2/N_2$ (or other inert gas) atmosphere both blankets the fries and prevents microbiological growth. No significant carboxylic acid formation occurs within par-fried sliced potato products prepared by this process when the $CO_2/N_2$ (or other inert gas) atmosphere is used. Any inert gas used should be heavier than air and in this specification and the claims that follow, the term "inert gas" means a gas which is essentially non-reactive as used and is heavier than air. Inert gas packing can be effected by first evacuating the packages, then back flushing with the given inert gas composition and heat sealing or simply purging the packages with the given inert gas composition. Any essentially water and gas tight packaging material which can be easily sealed may be used for the packages.

After packaging, the fries are then kept refrigerated until ready for finish-frying. Preferably, the fries are stored at just above their freezing temperature, i.e. about −4° C., but any normal refrigeration temperature is adequate. The par-fried potato product according to this process may be stored for about 3 to 8 weeks under refrigeration without any noticeable change in flavor, texture, taste or microbiological count. The final product, once finish-fried, has all of the taste, flavor and texture of a freshly fried sliced potato or french fry.

Several advantages are offered by the present invention. These advantages include:

(1) French fries require only about 1–3 minutes of deep frying (for final-finishing) versus 8–10 minutes for raw fries and 3–4 minutes for frozen (including thawing time). The faster frying results therefore in lower energy cost of production.

(2) Better utilization of cooking oils since the shorter frying times permit a greater processing volume than with raw or frozen. The shorter frying times also causes less oil absorption, and sputtering is reduced due to less surface moisture as compared with frozen fries.

(3) The processed french fries have an improved flavor since rapid cooling to 34°–36° F. results in much better retention of flavor and texture. This is believed to be due to a very minimum of cell damage taking place. Freezing, on the other hand, causes the growth of ice crystals which can cause much cell damage.

(4) The utilization of cryogenic chilling results in a reduction of product loss as compared to mechanical freezing. This feature contributes to the preservation of flavor and nutrition in food products.

(5) Inert gas packaging in conjunction with the preserving dip extends the shelf life of the french fries by excluding oxygen and therefore limiting chemical and microbial spoilage. This technique also provides a tight clean package which is thereby highly space efficient.

The preceeding advantages as well as those associated with frozen french fries are characteristic of the present method and therefore should be of benefit to institutional users. Furthermore, the finish-fried product derived from this method is crispy, golden brown and has good texture and flavor.

As an alternative to finish frying, the potatoes may be cooked in a convection oven at about 400° F. for about 17 minutes. The resulting product has an excellent flavor and appearance. The resulting product also has a crisp outer crust and a soft, moist inside. Thus, restaurants lacking deep fat fryers may prepare the product according to the present invention with excellent results. Moreover, since no oil or fat is used in final preparation, the resulting product has a significantly reduced calorie content.

With some adjustments, the method described above should be useful to prepare a product suitable for conventional oven cooking. These adjustments would include increasing somewhat the fat content of the refrigerated fry. Accordingly, a somewhat diminished shelf-life might be expected.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A method of preparing a par-fried, sliced potato product suitable for refrigerator storage, comprising the steps of:

forming cross linkages between labile hydrogen atoms on primary alcohol moieties of starch and sugar molecules on the surface of a raw potatoe slice to form an edible, pharmacologically acceptable, potato slice having ether or ester cross-linkages on the surface thereof;

water-blanching said cross-linked potato slice;

dipping said water-blanched potato slice in an aqueous solution, comprising an amount of a pharmaceutically acceptable oxidizing agent effective to oxidize all compound present in a reduced state to an oxidized state, about 0.05–0.3% of a non-reducing sugar, and a preserving amount of an antioxidant, for about 30 sec. to 5 min.;

par-frying said dipped potato slice to yield a potato slice having a moisture content of 40–65%;

defatting said par-fried potato slice to a fat content of 2–5%;

cryogenically cooling said par-fried potato slice to a temperature only slightly above the freezing point of said par-fried potato slice; and then packaging said cryogenically cooled potato slices under an atmosphere comprising 10–35% $CO_2$, the remainder being inert gas, said atmosphere having no more than about 1.0% residual oxygen.

2. The method of claim 1, wherein said oxidizing agent is an alkali acid pyrophosphate, alkali bisulfite or alkali salt or ethylenediaminetetraacetic acid and said oxidizing agent is present in said solution in an amount between about 0.05 and 1%.

3. The method of claim 2, wherein said antioxidant comprises about 0.02–1.0% erythorbic or ascorbic acid.

4. The method of claim 2, wherein said aqueous solution comprises 0.05–1% of an alkali acid pyrophosphate and 0.05–0.3% a non-reducing disaccharide.

5. The method of claim 4, wherein said alkali acid pyrophosphate is sodium acid pyrophosphate and said non-reducing disaccharide is dextrose.

6. The method of claim 5, wherein said water-blanching step is performed at about 75°–100° C. for about 3–6 mins.

7. The method of claim 6, wherein said par-frying step is performed for about 2–4 mins. at about 300°–375° F.

8. The method of claim 7, wherein said par-frying step is performed at about 325°–350° F.

9. The method of claim 8, wherein said par-frying step is performed at about 325° F.

10. The method of claim 7, wherein said cryogenic freezing step cools said potato slice to about +3° to −1° C.

11. The method of claim 10, wherein said cryogenic freezing step is performed by liquid $N_2$ or $CO_2$ refrigeration.

12. The method of claim 10, wherein said cross-linking step is performed by treating raw trimmed, sliced and peeled potatoes with an aqueous solution containing about 0.01%–0.5% of a cross-linking agent selected from the group consisting of aliphatic dihalides, ether-forming epoxy halogen compounds, phosphorus-containing organic oxidizing compounds and aliphatic acid anhydrides.

13. The method of claim 12, wherein said cross-linking agent is selected from the group consisting of propylene dichloride, dichloropentanes, ethylene dibromide, glycol dichlorohydrin, dichlorobutane, epichlorohydrin, epibromohydrin, phosphorus oxychloride metaphosphates, polymetaphosphates, succinic anhydride and adipic anhydride.

14. The method of claim 13, wherein said cross-linking agent is selected from the group consisting of phosphorus oxychloride, alkali metaphosphates, alkali polymetaphosphates, epichlorohydrin and succinic anhydride.

15. The method of claim 14, wherein said cross-linking agent is an alkali polymetaphosphate.

16. The method of claim 15, wherein said aqueous solution comprises about 0.02–4% sodium hexametaphosphate and about 0.05 to 1.0% sodium hydroxide and said potato slice is treated for about 30 sec. to 30 mins.

17. The method of claim 12, wherein said aqueous solution has a pH of about 5–12 and said potato slice is treated for about 30 sec.-30 mins.

18. The product of the process of claim 1.

19. The product of the process of claim 4.

20. The product of the process of claim 6.

21. The product of the process of claim 16.

* * * * *